US 11,514,569 B2

(12) United States Patent
Avenel et al.

(10) Patent No.: US 11,514,569 B2
(45) Date of Patent: Nov. 29, 2022

(54) SEGMENTATION OF HISTOLOGICAL TISSUE IMAGES INTO GLANDULAR STRUCTURES FOR PROSTATE CANCER TISSUE CLASSIFICATION

(71) Applicant: CADESS.AI AB, Uppsala (SE)

(72) Inventors: Christophe Avenel, Uppsala (SE); Ingrid Carlbom, Summit, NJ (US)

(73) Assignee: CADESS.AI AB, Uppsala (SE)

( * ) Notice: Subject to any disclaimer, the term of this patent is extended or adjusted under 35 U.S.C. 154(b) by 0 days.

(21) Appl. No.: 16/500,892

(22) PCT Filed: Mar. 28, 2018

(86) PCT No.: PCT/SE2018/050339
§ 371 (c)(1),
(2) Date: Oct. 4, 2019

(87) PCT Pub. No.: WO2018/186789
PCT Pub. Date: Oct. 11, 2018

(65) Prior Publication Data
US 2020/0134817 A1    Apr. 30, 2020

Related U.S. Application Data

(60) Provisional application No. 62/482,240, filed on Apr. 6, 2017.

(51) Int. Cl.
*G06T 7/00* (2017.01)
*G06T 7/187* (2017.01)
(Continued)

(52) U.S. Cl.
CPC ............ *G06T 7/0012* (2013.01); *G06T 7/136* (2017.01); *G06T 7/155* (2017.01); *G06T 7/187* (2017.01);
(Continued)

(58) Field of Classification Search
CPC ....... G06T 7/00; G06T 7/0002; G06T 7/0012; G06T 7/11; G06T 2207/30004;
(Continued)

(56) References Cited

U.S. PATENT DOCUMENTS

| 8,488,863 | B2 * | 7/2013 | Boucheron | G06T 7/11 |
| | | | | 382/133 |
| 2006/0127880 | A1 * | 6/2006 | Harris | G06K 9/00127 |
| | | | | 435/4 |

(Continued)

OTHER PUBLICATIONS

Harris in view of Landstrom et al. (Anders Landström, Matthew J. Thurley, Adaptive morphology using tensor-based elliptical structuring elements, Pattern Recognition Letters, vol. 34, Issue 12, 2013, pp. 1416-1422,ISSN 0167-8655, https://doi.org/10.1016/j.patrec.2013.05.003. (Year: 2013).*

(Continued)

*Primary Examiner* — Vu Le
*Assistant Examiner* — Courtney Joan Nelson
(74) *Attorney, Agent, or Firm* — Porter Wright Morris & Arthur LLP (57) ABSTRACT

The method according to the invention utilizes a color decomposition of histological tissue image data to derive a density map. The density map corresponds to the portion of the image data that contains the stain/tissue combination corresponding to the stroma, and at least one gland is extracted from said density map. The glands are obtained by a combination of a mask and a seed for each gland derived by adaptive morphological operations, and the seed is grown to the boundaries of the mask. The method may also derive an epithelial density map used to remove small objects not corresponding to epithelial tissue. The epithelial density map may further be utilized to improve the identification of glandular regions in the stromal density map. The segmented (Continued)

gland is extracted from the tissue data utilizing the grown seed as a mask. The gland is then classified according to its associated features.

19 Claims, 5 Drawing Sheets

(51) Int. Cl.
  *G06T 7/136* (2017.01)
  *G06T 7/155* (2017.01)
  *G06K 9/00* (2022.01)
  *G06K 9/46* (2006.01)
  *G06V 10/56* (2022.01)
  *G06V 20/69* (2022.01)

(52) U.S. Cl.
  CPC ............ *G06V 10/56* (2022.01); *G06V 20/695* (2022.01); *G06V 20/698* (2022.01); *G06T 2207/10024* (2013.01); *G06T 2207/10056* (2013.01); *G06T 2207/30024* (2013.01); *G06T 2207/30081* (2013.01); *G06T 2207/30096* (2013.01)

(58) Field of Classification Search
  CPC ...... G06T 2207/10056; G06K 9/00147; G06K 9/00127; G06K 9/0014
  See application file for complete search history.

(56) References Cited

U.S. PATENT DOCUMENTS

| | | | | |
|---|---|---|---|---|
| 2009/0161928 | A1* | 6/2009 | Khamene | G06T 7/0012 382/128 |
| 2009/0226060 | A1* | 9/2009 | Gering | G06T 7/11 382/128 |
| 2013/0230230 | A1* | 9/2013 | Ajemba | G06K 9/00147 382/133 |
| 2014/0314301 | A1* | 10/2014 | Azar | G06T 7/0012 382/133 |

OTHER PUBLICATIONS

G. Litjens, O. Debats, J. Barentsz, N. Karssemeijer and H. Huisman, "Computer-Aided Detection of Prostate Cancer in MRI," in IEEE Transactions on Medical Imaging, vol. 33, No. 5, pp. 1083-1092, May 2014, doi: 10.1109/TMI.2014.2303821. (Year: 2014).*

Carlbom, Ingrid B. et al., PICRO-SIRIUS-HTX Stain for Blind Color Decomposition of Histopathological Prostate Tissue, Department for Information Technology, Centre for Image Analysis, Uppsala University, Department of Immunology, Genetics, and Pathology, Uppsala University, pp. 282-285 (2014) (Year: 2014).*

Landstrom et al. (Anders Landström, Matthew J. Thurley, Adaptive morphology using tensor-based elliptical structuring elements, Pattern Recognition Letters, vol. 34, Issue 12, 2013, pp. 1416-1422,ISSN 0167-8655, https://doi.org/10.1016/j.patrec.2013.05.003. (Year: 2013).*

M. Gavrilovic et al., "Blind Color Decomposition of Histological Images," in IEEE Transactions on Medical Imaging, vol. 32, No. 6, pp. 983-994, Jun. 2013, doi: 10.1109/TMI.2013.2239655. (Year: 2013).*

Y. Peng, Y. Jiang, L. Eisengart, M. A. Healy, F. H. Straus and X. J. Yang, "Segmentation of prostatic glands in histology images," 2011 IEEE International Symposium on Biomedical Imaging: From Nano to Macro, 2011, pp. 2091-2094, doi: 10.1109/ISBI.2011.5872824. (Year: 2011).*

Carlbom, Ingrid B. et al., PICRO-SIRIUS-HTX Stain for Blind Color Decomposition of Histopathological Prostate Tissue, Department for Information Technology, Centre for Image Analysis, Uppsala University, Department of Immunology, Genetics, and Pathology, Uppsala University, pp. 282-285 (2014).

Nguyen, Kien et al., Automated Gland Segmentation and Classification for Gleason Grading of Prostate Tissue Images, 2010 International Conference on Pattern Recognition, pp. 1497-1500 (2010).

Search report from corresponding European Application No. 18780309.3, dated Dec. 11, 2020.

* cited by examiner

SEGMENTATION OF HISTOLOGICAL TISSUE IMAGES INTO GLANDULAR STRUCTURES FOR PROSTATE CANCER TISSUE CLASSIFICATION

TECHNICAL FIELD OF INVENTION

The present invention relates to segmentation of histological tissue images into glandular structures for prostate cancer tissue classification.

BACKGROUND OF THE INVENTION

Prostate cancer malignancy grading depends on the accurate identification and classification of the glandular components in the prostate tissue. In the grading system according to Gleason, malignant glands are classified into benign, PIN, and grades 1-5, although the grades 1 and 2 are no longer in use. In the new ISUP grade group system [4] [5], there are five grade groups, ranging from discrete well-formed glands to tissue that lacks gland formation with or without poorly formed/fused/cribriform glands. Regardless of the grading system, it is necessary that the pathologist identify the morphological variations in the glandular components as they are closely linked to the aggressiveness of the cancer.

Digital pathology is an emerging field, where glass slides are scanned and stored as digital images for improved workflow, computer-aided analysis, and storage and management of the data. Digital pathology facilitates remote consultation of experts across the world and may alleviate the pathologist deficit that is anticipated in most countries from population growth and increase in disease incidence. Once tissue slides are digitized, it is possible to enhance the resulting images digitally and also extract information to support the pathologists' decision process. This has the potential to reduce the intra- and inter-observer diagnostic variation and improve the prognostication, thereby improve patients' quality of life and reduce the healthcare burden from needless treatment. But computer-aided analysis of tissue data requires high-quality image data, where the tissue components are clearly delineated and where the stain variations and noise are kept to a minimum.

Pathologists rely on multiple, contrasting stains to analyze tissue samples, but histological stains are developed for visual analysis and are not always ideal for automatic analysis.

Earlier work described a methodology to compare different histological stains for classification of components in histological tissue. This methodology was used to evaluate stains for both supervised and unsupervised classification which showed that certain stains consistently outperform others according to objective error criteria [1].

Earlier work also describes an automatic method (the Blind Color Decomposition, BCD, method) for highly accurate blind color decomposition of histological images into density maps, one for each stained tissue type [2]. The method decouples intensity from color information and bases the decomposition only on the tissue absorption characteristics of each stain. The method also models biochemical noise, as well as noise from the CCD (charge-coupled device) array in the microscope. Careful selection of the tissue stain combined with BCD lays the foundation for accurate computer-aided processing of tissue data [3]. These techniques form the basis for gland segmentation of histological tissue.

SUMMARY OF THE INVENTION

The method according to the invention identifies individual glands in prostate tissue image data for the purpose of classifying these glands into categories, including benign, prostatic intraepithelial neoplasia (PIN), and grading patterns as defined by Gleason or by the ISUP new grade group system. A microscope captures histological tissue image data from a tissue sample that is stained with at least one stain, said stain being light absorbent and stains the stroma so that it is well differentiated from other tissue in the sample. The method transforms the histological tissue image data into at least one density map, said density map corresponding to the stroma in the histological tissue image, preferably according to U.S. Pat. No. 9,607,374 [4]. From the stromal density data, the method according to the invention identifies the glands by utilizing morphological operations to find a mask, said mask corresponding to non-stromal regions, and to find one seed in each disconnected or weakly connected region in said mask. Furthermore the method according to the invention grows the seeds until said seeds meet said mask, and identifies at least one gland by applying said grown seeds to the histological tissue image. The method according to the invention may also utilize a second stain, said stain being light absorbent, and said stain being absorbed primarily by the epithelium, and transform the histological tissue image data to an epithelial density map to remove small objects that are not part of a glandular structure. To improve the segmentation, this second density map may also be used in combination with the stromal density map to refine the non-stromal regions mask.

The method according to the invention classifies prostate tissue data into categories, wherein said classification comprises the steps of:
  capturing of histological tissue image data from a tissue sample that has been stained with at least one stain, said image data comprising a set of pixels, said stain being light absorbent, and said stain being absorbed primarily by the stroma;
  deriving at least one density map, said density map corresponding to the portion of the image data that represents the stroma;
  identifying the boundary of at least one gland from said density map, where said gland is surrounded by stroma;
  utilizing said boundary in said density map to find the corresponding gland in the histological tissue image data;
  classifying at least one gland into a category.

According to one embodiment of the invention, the stromal density map is preferably derived using the BCD method, although other methods are possible to use.

According to one embodiment of the invention, said gland is preferably derived using morphological operations on said density map.

According to one embodiment of the invention, the categories include, but are not limited to benign, prostatic intraepithelial neoplasia (PIN), and grading patterns as defined by Gleason or by the new ISUP grade group system, such categories hereinafter referred to as predefined set of categories.

According to one embodiment of the invention, the classification of a gland into a category is determined by features in said gland, said features include but are not limited to number of luminae, nuclear crowding, and roundness of the glands and their luminae.

According to one embodiment of the invention, the classification of a gland into a category is determined by the content of said gland.

In a second embodiment of the invention, segmentation of histological tissue image data, image data comprising a set of pixels, into glands where said glands are surrounded by stromal tissue, comprises the steps of:

- capturing of histological tissue image data from a tissue sample that has been stained with at least one stain, said stain being light absorbent, and said stain being absorbed primarily by the stroma;
- deriving at least one density map, said density map corresponding to the portion of the histological tissue image data that represents the stroma;
- identifying a mask, said mask covering non-stromal tissue;
- finding one seed for each disconnected or weakly connected region in said mask, said seeds being contained in said regions;
- growing the seeds until said seeds meets said mask;
- identifying at least one gland by applying said grown seeds to the histological tissue image.

The method according to the invention may also utilize a second stain, said stain being light absorbent, and said stain being absorbed primarily by the epithelium, and a second density map is derived representing the epithelium in said histological tissue image data. Both the first and second density maps are preferably derived using the BCD method, although other methods are possible to use.

According to one embodiment of the invention, the mask covers low-density regions in the stromal density map.

According to one embodiment of the invention, the mask covers low-density regions in a combination of the two density maps, wherein said combination is the pixel-by-pixel subtraction of the epithelial density map from the stromal density map.

According to one embodiment of the invention, the mask identification further comprises the steps of:

- finding said mask using morphological opening,
- converting said mask to a binary mask utilizing thresholding, and
- optional removing of non-glandular objects, said objects lacking epithelial content as determined by the epithelial density map.

The morphological opening may use adaptive techniques, preferably employing a tensor-based elliptical structuring element. The thresholding may preferably employ gradient maximization techniques, but other thresholding techniques may also be used.

According to one embodiment of the invention the finding of said seed further comprises the steps of:

- finding one seed using morphological erosion for each disconnected or weakly connected region in said mask,
- converting said seeds into binary seeds utilizing thresholding, and
- finding individual seeds by utilizing connected component labelling.

The morphological erosion may preferably employ adaptive techniques. The adaptive erosion may preferably employ a tensor-based elliptical structuring element. The thresholding may preferably employ gradient maximization techniques, but other thresholding techniques may also be used.

According to one embodiment of the invention the region-growing preferably employs watershed techniques.

The image capture and analysis apparatus according to the invention comprises:

- microscope adapted to capturing histological tissue image data from a tissue sample that has been stained with at least one stain, the said stain or stains being light absorbent;
- image processing modules adapted to perform the steps of:
- deriving a density map
- segmenting at least one gland from said density map; and
- classifying said gland into a category.

Thanks to the present invention it is possible to provide an automated and reliable segmentation of glandular structures in histological tissue images, which is a prerequisite for a computer-aided tool for the classification of prostate cancer glands into their categories. In contrast to methods in the literature, the method according to this invention identifies glandular structures of all malignancy grades.

One advantage of the method according to the invention is that it can be adapted easily to different stains and staining methods, provided the stain allows a good differentiation of the glandular structures from the surrounding stroma.

A further advantage is that this method generalizes to the segmentation and classification of other types of histological tissue which has a distinct glandular structure.

BRIEF DESCRIPTION OF THE DRAWINGS

Preferred embodiments of the invention are described with reference to the accompanying figures, wherein FIGS. 1A-H illustrates prostate cancer glands of different categories;

FIGS. 2A-J illustrates the gland segmentation steps;

DETAILED DESCRIPTION OF THE INVENTION

In the following, the focus is on prostate cancer tissue, but the method of the invention may be applied to other histological tissue data.

Malignancy grading of the prostate relies heavily on changes in the glandular architecture. A healthy prostate comprises branched ducts and glands, with two layers of cells (FIG. 1A). Malignant glands of low grade are regular in size with a central lumen, surrounded by one layer of epithelial cells with the nuclei located basally (FIG. 1B). These individual, discrete well-formed glands belong to grade 3 on the Gleason scale [5]. When the cancer progresses in degree of malignancy, the glands lose uniformity in size and shape and the inter-glandular distances becomes more variable. These glands are referred to as poorly-formed or fine caliber Gleason grade 4 (FIG. 1C). Other types of grade 4 glands form cribriform structures with multiple luminae (FIG. 1D), or fuse into irregular structures (FIGS. 1E-F). Intra-ductal carcinoma, which can form cribriform structures, is also considered to be of grade 4 in the Gleason system. Finally, in Gleason grade 5 we see a lack of gland formation, with individual cells or files of epithelial cells (FIG. 1H). Cribriform structures with necrosis are also considered of highest grade. In summary, all glands have an epithelium with at least one epithelial nucleus, surrounded by stroma. Prostate gland segmentation is a key component in prostate tissue classification. From the glandular structures it is possible to extract glandular features that are known to be linked to malignancy, such as number of luminae, nuclear crowding, and roundness of the glands and their luminae, and are used by pathologists in routine practice for grading.

There are many examples in the literature of prostate gland segmentation as part of automatic malignancy grading systems. Naik et al. [6] find the lumen using color information and use the lumen boundary to initialize level set curves which evolve until they reach the epithelial nuclei. The final glandular structure includes only the lumen and the epithelium without the nuclei. Nguyen et al. [7] also start with the lumen and grow that structure to include the epithelial nuclei. These methods work from the lumen out to a layer of epithelial nuclei, and can thus successfully find only benign glands, glands of Gleason grade 3, and some poorly formed glands of grade 4, but cannot identify cribriform structures and grade 5. Vidal et al. use level sets and mean filtering to extract regions of interest in prostate tissue, but do not accurately segment individual glands [8]. Peng et al. employ principal component analysis, K-means clustering, followed by region growing to segment prostatic glands [9]. The authors state that finding high-grade cancer is difficult and also not necessary for finding cancerous foci. This is however not always true, since in more aggressive cases, fine caliber 4 and grade 5 may appear without surrounding lower grade cancer. There are many recent attempts to apply deep learning to tissue segmentation, as for example done by Xu et al. [10]. Tabesh et al. use a different approach identifying small objects in the prostate tissue with similar characteristics which are used directly for classification of cancerous and non-cancerous tissue, without identification of the underlying glandular structure [11]. In summary, without the glandular structures it is impossible to identify all the Gleason grades shown in FIG. 1.

Figure 1:
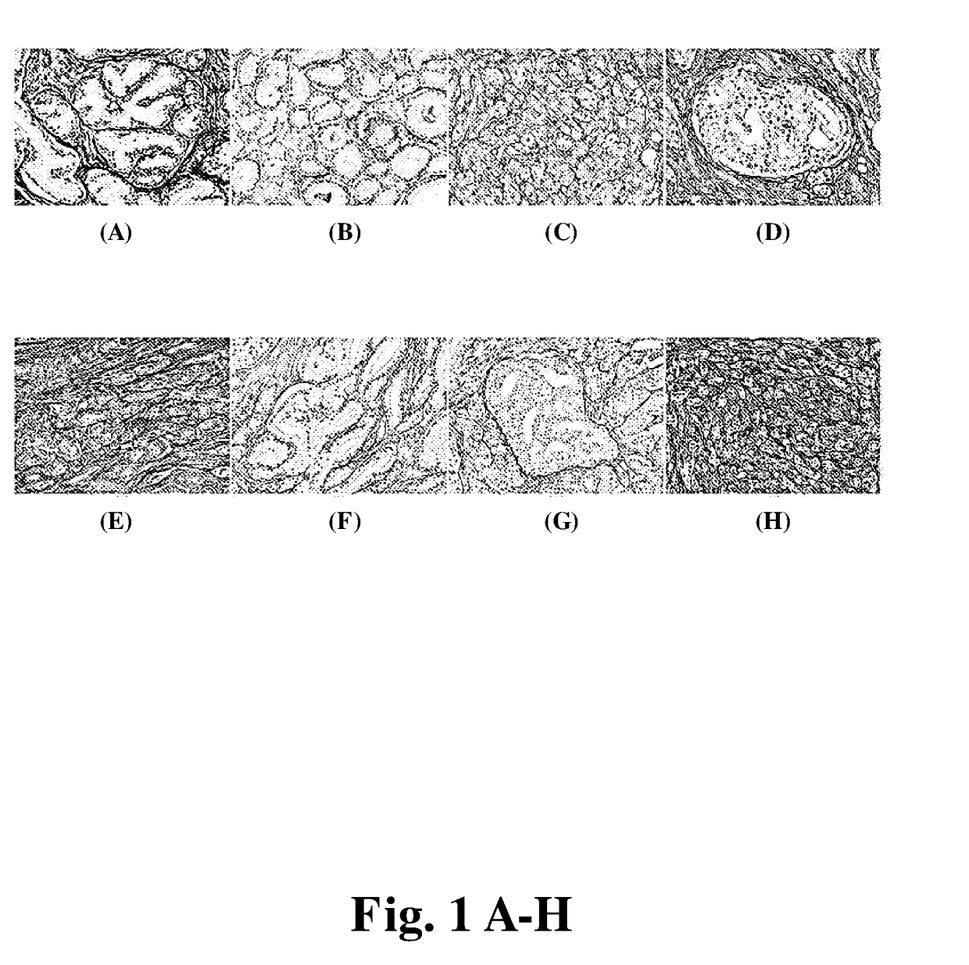

It is clear that to automatically identify all glandular patterns shown in FIG. 1, an algorithm must work from the stromal border and in, not from the lumen out. However, traditionally prostatic tissue is stained with Hematoxylin-Eosin [12], which gives poor differentiation between epithelium and stroma, as both are stained in shades of red/pink by eosin. But, an accurate prostate gland segmentation algorithm that works for all types of prostate glands requires a stain with good differentiation between glandular epithelium and stroma.

FIG. 1 illustrates the prostate cancer grades according to Gleason. The histological tissue image in FIG. 1A shows a benign gland, FIG. 1B shows well-formed glands (Gleason grade 3), FIG. 1C shows poorly formed glands (Gleason grade 4), FIG. 1D shows a cribriform gland (Gleason grade 4), FIG. 1E show small fused glands (Gleason grade 4), FIG. 1F shows large fused glands (Gleason grade 4), FIG. 1G shows intraductal carcinoma (Gleason grade 4), and FIG. 1H shows poorly formed glands and single cells (Gleason grades 4 and 5).

Figure 2:
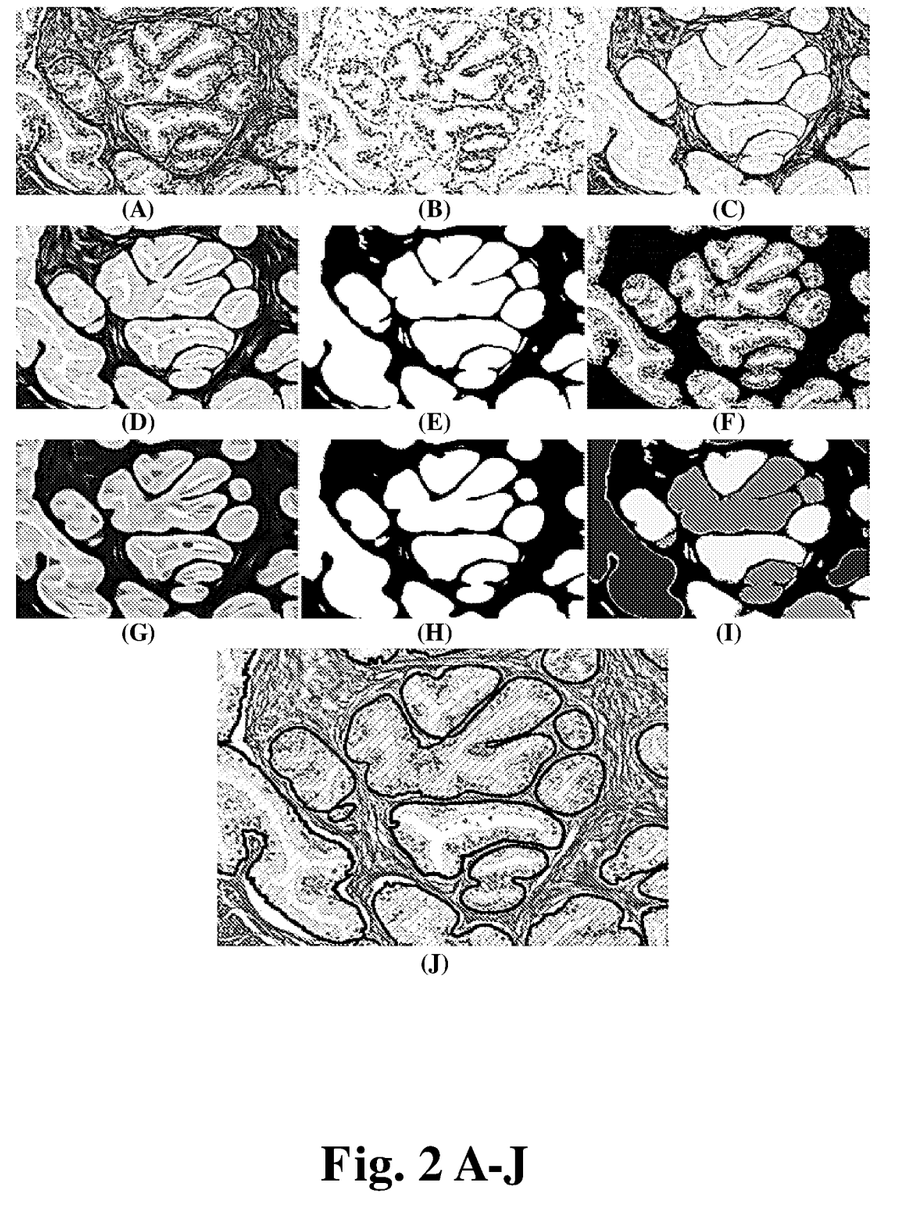
Figure 4:
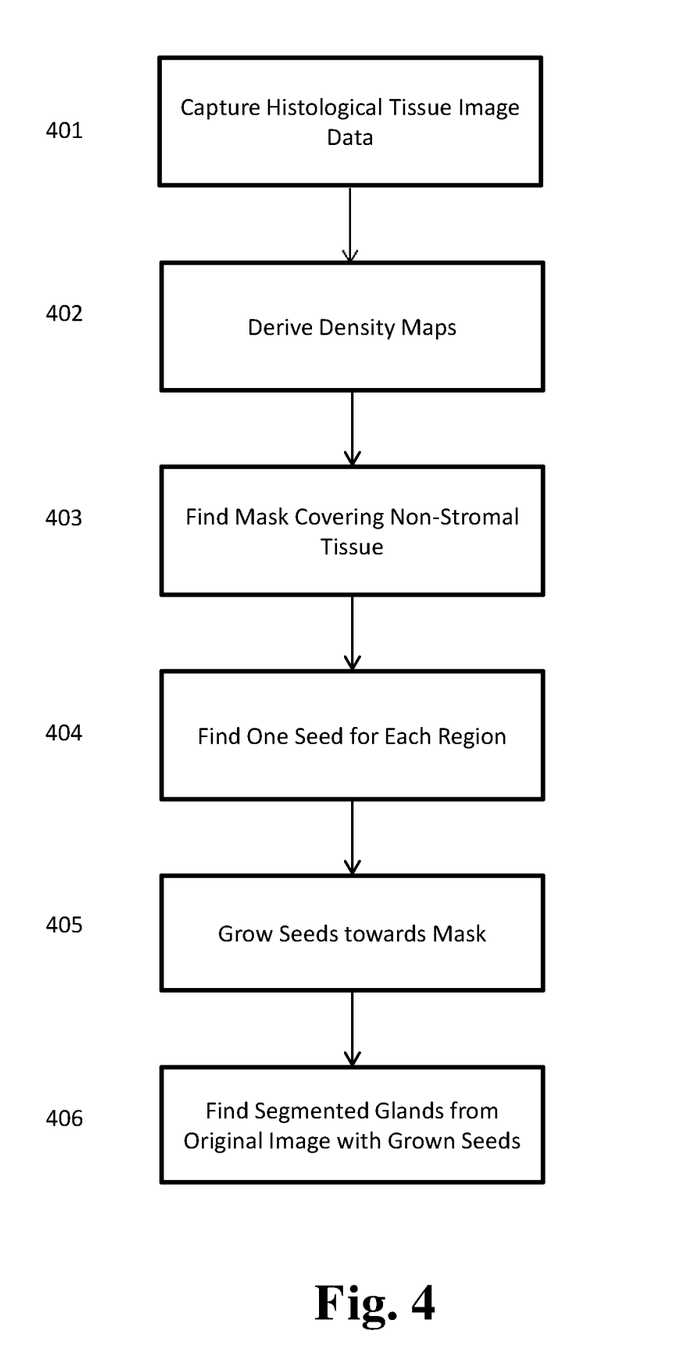
FIG. 4 is a flow chart representing the process flow from acquisition of histological tissue image data to the generation of segmented glands according to the present invention.

Referring to FIG. 2, according to the present invention, the histological image data is segmented into its glandular components, in accordance with the method described in FIG. 4. The histological tissue in FIG. 2A, which has been captured from a histological tissue sample stained with Picro-Sirius red Hematoxylin [13], is decomposed into two density maps corresponding to the epithelial tissue (FIG. 2B) and the stromal tissue (FIG. 2C), according to known methods of producing density maps, preferably according to the BCD method. It should be noted that the stain combination used herein is one of several stain combinations suitable for the method according to the invention; other stain combinations that provides a good differentiation between the stroma and neighboring tissue may also be used, such as Mallory's trichrome. In accordance with the present invention, and with reference to FIG. 4, FIG. 2D shows the stromal density map after morphological opening, and FIG. 2E the non-stromal mask. In accordance with the present invention, and illustrated in FIG. 4, FIG. 2F shows the result of the removal of non-epithelial objects. FIG. 2G shows the result of morphological erosion of the stromal density map; FIG. 2H the resulting seeds; FIG. 2I individual seeds superimposed on the non-stromal mask; and FIG. 2J shows the result obtained by applying a watershed with seeds in FIG. 2I and mask in FIG. 2I on the image in FIG. 2A.

Figure 3:
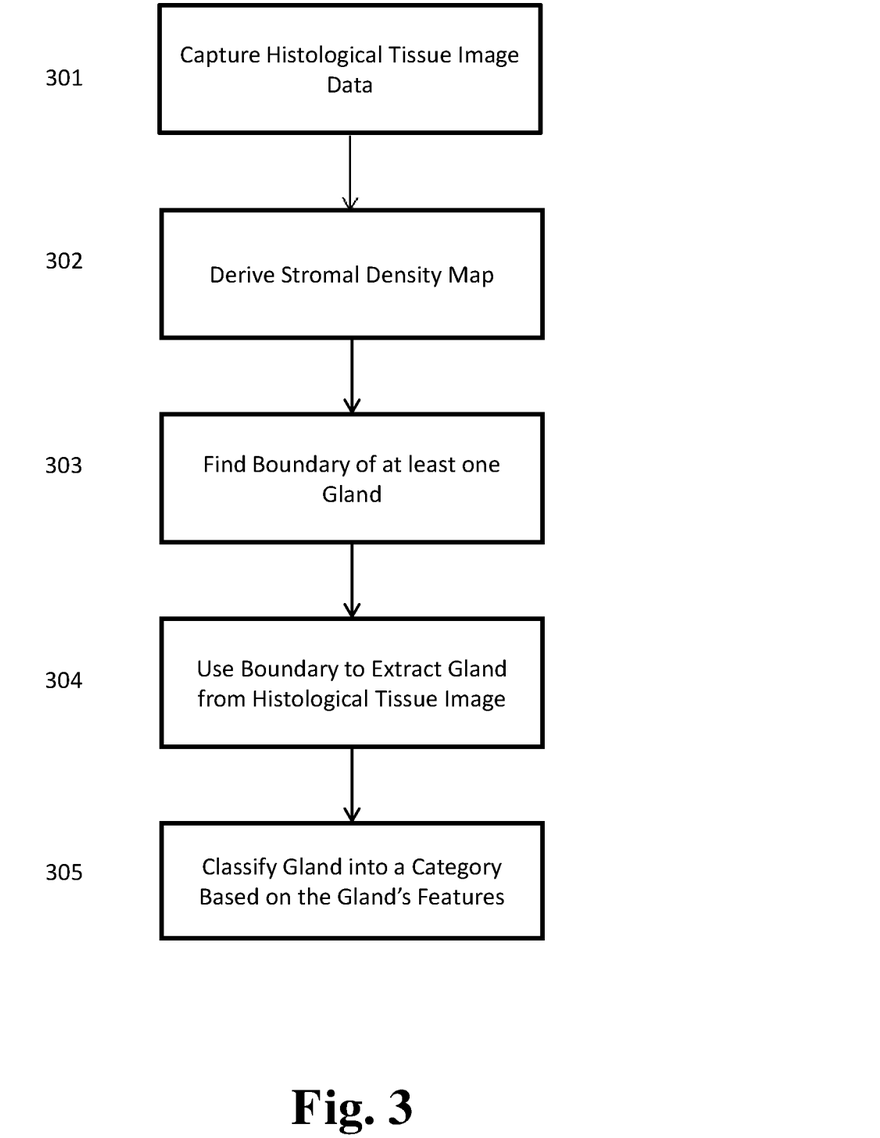
FIG. 3 is a flow chart representing the process flow from acquisition of histological tissue image data to the classification of segmented glands into categories according to the present invention.

Referring to FIG. 3, according to the method of the present invention, histological tissue image data, which has been acquired with a microscope from a tissue sample, classifies prostate glands into categories. The method for classification of a gland into a category comprises steps to
  301 capture of histological tissue image data;
  302 derive stromal density map;
  303 find the boundary of at least one gland using morphological operations;
  304 utilize said boundary to extract the corresponding gland in the histological tissue image;
  305 classify said gland into a category based on said gland's associated features.

Referring to FIG. 4, according to the method of the present invention, histological tissue image data which has been acquired with a microscope from a tissue sample, is segmented into at least one gland. The method for segmentation of the histological tissue image into glands comprises steps to
  401 capture of histological tissue image data;
  402 derive density maps;
  403 find a mask covering non-stromal tissue;
  404 find one seed for each region;
  405 grow the seeds until said seeds meet said mask;
  406 find segmented glands from histological tissue image utilizing the seeds: The method of the present invention uses the said grown seeds as a mask on the histological tissue image to extract the individual glands, with reference to FIG. 2J.

It should be noted that the steps 403 and 404 may be performed in any order.

Figure 5:
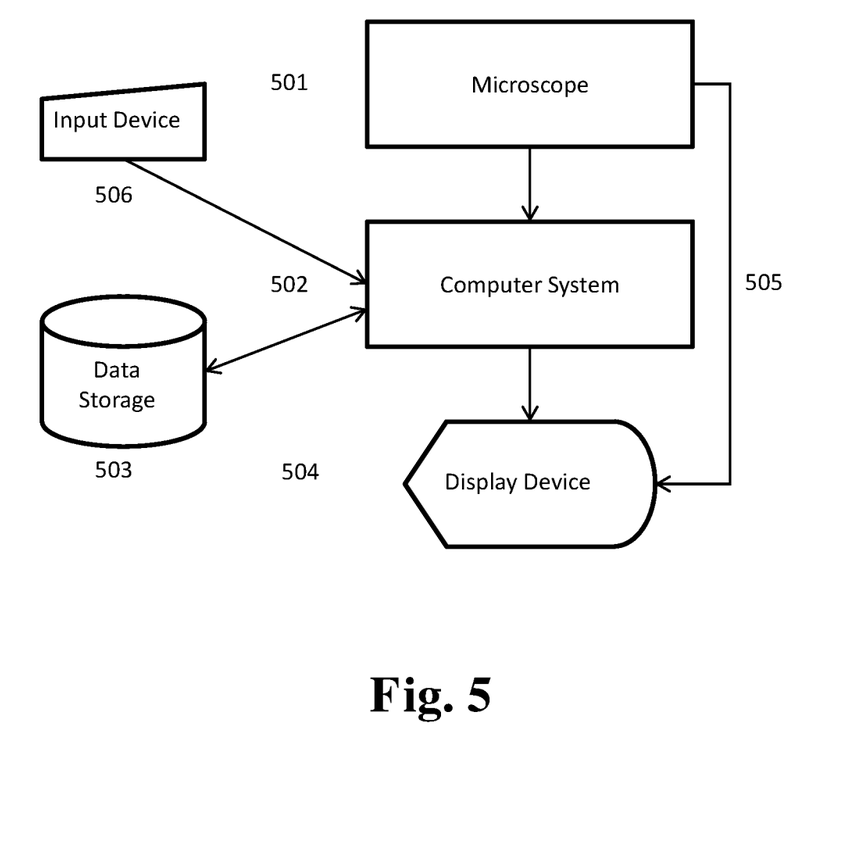
FIG. 5 is a representative system for carrying out the invention.

FIG. 5 illustrates schematically an image capture and analysis apparatus suitable for carrying out the invention. This schematic is for illustration purposes only and those skilled in the art will appreciate that many other system configurations are possible. The image capture and analysis apparatus comprises:
  501 a microscope for capturing histological tissue image data from tissue samples may be a bright-field microscope accompanied by a digital CMOS or CCD camera with objectives that may have, but are not limited to, 10x/0.30, and 20x/.50 objectives. The microscope may be equipped with standard red-green-blue optical filters but is not limited to these types of filters. For the purpose of this invention, a microscope may also use a whole slide scanner for input (see aperio.com). For the purpose of this invention the term microscope includes all devices that may capture tissue samples.
  502 a computer system. Those skilled in the art will appreciate that the invention may be implemented on a variety of computer systems, including personal computers, server computers, main frame computers, and hand-held devices. Furthermore, the invention may be practiced in a networked environment, where the microscope (501) may be located remotely relative to the computer, and where the computer and the microscope are connected over some network, and data storage (503) may be located remotely and accessed over a network.

504 a display device. The resulting glands may be viewed on a standard computer monitor and the resulting glands may be mixed with or overlaid on the histological tissue image data (505).

506 an input device utilizing any of a variety of devices, including but not limited to keyboards.

In one embodiment of the invention, the image capture system apparatus is adapted to capture histological tissue image data from a tissue sample that has been stained with at least one stain, the said stains being light absorbent and absorbed by stroma.

In one embodiment of the invention, the computer system is adapted to execute the steps of the method herein.

Method for Gland Segmentation for Prostate Tissue Classification

Image Capture (Steps 301 and 401)

In steps 301 and 401, the above described image capture system apparatus is used to record the histological tissue image data from a tissue sample stained with one or more stains.

Derive Stromal Density Map (Step 302)

In step 302, the method derives a stromal density map from the tissue image data, preferably using the Blind Color Decomposition (BCD) method, but other methods, such as non-negative matrix factorization, may also be used.

Find One Prostate Gland Boundary (Step 303)

In step 303, the method finds the boundary of at least one gland using the stromal density map, preferably using morphological operations, but other methods may also be used.

Find One Prostate Gland (Step 304)

In step 304, the method utilizes said boundary in the density map to find the corresponding gland in the histological tissue data.

Classify Gland in Tissue (Step 305)

In step 305, the glands are classified into categories based on the glands' associated features. The classification of a gland into a category may be determined based on its morphology, said morphology defined by features, including, but not limited to number of luminae, nuclear crowding, and roundness of the glands and their luminae. Also, the classification of a gland into a category is determined by the content of said gland.

Derive at Least One Density Map (Step 402)

In step 402, the method derives a stromal density map and optionally an epithelial density map from the histological tissue image data, preferably using the Blind Color Decomposition (BCD) method, but other methods, such as non-negative matrix factorization may also be used.

Find a Mask Covering Non-Stromal Tissue (Step 403)

In step 403, the method identifies a mask, said mask covering the low-density regions in said stromal density map, that is said mask covering non-stromal regions. To find said mask, the method preferably applies an adaptive morphological opening, preferably with tensor-based elliptical structuring elements [14], to said stromal density map, with reference to FIG. 2D. The local structure tensor adapts elliptical structuring elements to lines in regions of strong single-directional features and to disks where the stroma has no prevalent direction. An adaptive filter which varies depending on the local image structure ensures correct separation of distinct glands without removal of small glands.

The method further utilizes the contrast between stromal tissue and non-stromal tissue in the stromal density map to ensure a good separation between said stromal and non-stromal regions. To accomplish said separation, the morphological opening applied to the stromal density map is followed preferably by the use of gradient maximization thresholding to arrive at a binary representation of the non-stromal mask, with reference to FIG. 2E. The gradient maximization thresholding technique finds the threshold that best separates the stromal and non-stromal component by maximizing the mean of the Sobel operator along the boundaries of the binary representation of the mask.

To improve the identification of the non-stromal tissue, the epithelial density map may be combined with the stromal density map by subtracting the epithelial density map from the stromal density map, pixel-by-pixel. By identifying the mask from the combined density maps, the glandular boundaries become more accurate.

The method further removes objects without epithelial content, by referring to said epithelial density map corresponding to said stromal density map, with reference to FIG. 2F.

Find One Seed for each Region (Step 404)

The binary regions in the non-stromal mask are either disconnected, or weakly connected that is connected by only a few pixels. In step 404, the method finds one seed for each disconnected or weakly connected region in said mask, said seeds being contained in said to regions. The seed is obtained by eroding said stromal density map using the adaptive filter with reference to step 403 above, and with reference to FIG. 2G.

The method further utilizes the contrast between stromal tissue and non-stromal tissue in said stromal density map after erosion to ensure a good separation between said stromal and non-stromal components preferably by the use of a thresholding method to arrive at a binary representation of the seeds, with reference to FIG. 2H. This thresholding method may utilize the gradient maximization technique with reference to step 403 above, but other techniques may be used. The erosion will separate glands that are weakly connected, but will not remove small glands. FIG. 2I shows the seed (one level of grey for each seed) overlaid on the non-stromal mask with reference to step 403 above.

Growing the Seeds until said Seeds Meet said Mask (Step 405)

In step 405, the method grows the seeds until said seeds meet said mask. The method preferably utilizes the watershed method [15] for growing said seeds towards said non-stromal mask, but other region growing techniques may be employed. The final segmentation mask for the individual glands, with reference to FIG. 2J, is obtained by applying a watershed algorithm initialized with the seeds, with reference to FIG. 2I, and said non-stromal mask as boundary, also with reference to FIG. 2I.

The method may be applied to specimens from any organ system in humans or animals, including but not limited to prostate, breast, kidney, lung, intestines, blood vessels, or nerve tissue. The method applies to all types of specimens that can be stained and captured with a microscope.

BIBLIOGRAPHY

[1] J. C. Azar, C. Busch and I. B. Carlbom, "Histological Stain Evaluation for Machine Learning Applications," *J Pathol Inform* 4 (11), March 2013.

[2] M. Gavrilovic, J. C. Azar, J. Lindblad, C. Wahlby, E. Bengtsson, C. Busch and I. B. Carlbom, "Blind Color Decomposition of Histological Images," *IEEE Trans on Medical Imaging*, Vol. 32, Issue 6, pp. 983-994, 2013.

[3] I. B. Carlbom, C. Avenel and C. Busch, "Picro-Sirius-Htx Stain for Blind Color Decomposition of Histo-pathological Prostate Tissue," in *Proc. IEEE Int. Symp. Biomedical Imaging (ISBI)*, 2014.

[4] J. C. Azar, C. Busch, I. B. Carlbom and M. Gavrilovic, "Color Decomposition in Histology," U.S. Pat. No. 9,607,374, March 2017.

[5] D. F. Gleason, "Histologic Grading of Prostate Cancer: A perspective," *Human Pathology*, vol. 23, pp. 273-279, March 1992.

[6] S. Naik, S. Doyle, M. Feldman, J. Tomaszewski and A. Madabhushi, "Gland segmentation and computerized Gleason grading of prostate histology by integrating low, high-level and domain specific informatio," in *In Proc of 2nd Workshop on Microsopic Image Analysis with Applications in Biology*, Piscataway, N.J., USA, 2007.

[7] K. Nguyen, A. Jain and R. Allen, "Automated Gland Segmentation and Classification for Gleason Grading of Prostate Tissue Images," in *Proc. Intl Conference on Pattern Recognition* (ICPR), 2010.

[8] J. Vidal, G. J. Bueno G., M. García-Rojo, F. Relea and O. Déniz, "A fully automated approach to prostate biopsy segmentation based on level-set and mean filtering," *J Pathol Inform* Vol 2(5), 2011.

[9] Y. Peng, Y. Jiang, L. Eisengart, M. Healy, F. Straus and X. Yang, "Segmentation of prostatic glands in histology images," in 2011 *IEEE Intl. Symp. on Biomedical Imaging: From Nano to Macro (ISBI 2011)*, 2011.

[10] Y. Xu, Y. Li, Y. Wang, M. Liu, Y. Fan, M. Lai and E. I.-C. Chang, "Gland instance segmentation using deep multichannel neural networks," *IEEE Transactions on Biomedical Engineering*, vol. 64, no. 12, pp. 2901-2912, 2017.

[11] A. Tabesh, M. H.-Y. Teverovskiy, V. Kumar, D. Verbel, A. Kotsianti and O. Saidi, "Multifeature Prostate Cancer Diagnosis and Gleason Grading of Histological Images," *IEEE Trans. Medical Imaging*, vol. 26, no. 10, pp. 1366-1378, 2007.

[12] P. Mayer, "Hematoxylin and eosin (H&E) staining protocol," *Mittheilungen aus der Zoologischen Station zu Neapel*, vol. 12, p. 303, 1896.

[13] H. Puchtler, F. S. Waldrop and L. S. Valentine, "Polarization microscopic studies of connective tissue stained with picro-sirius red FBA," *Beiträge zur Pathologic*, vol. 150, pp. 174-187, 1973.

[14] A. Landström and M. J. Thurley, "Adaptive morphology using tensor-based elliptical structuring elements," *Pattern Recognition Letters*, vol. 34, no. 12, pp. 1416-1422, 1 Sep. 2013.

[15] J. I. Epstein, W. C. Allsbrook Jr, M. B. Amin, L. L. Egevad and the ISUP Grading Committee, "The 2005 International Society of Urological Pathology (ISUP) Consensus Conference on Gleason Grading of Prostatic Carcinoma," *Am J Surg Pathol. Volume* 29(9), pp. 1228-42, 2005.

[16] S. Beucher and C. Lantuéj, "Use of watersheds in contour detection," in *Intl Workshop on Image Processing, Real-Time Edge and Motion Detection/Estimation*, Rennes, 1979.

What is claimed is:

1. A method for identifying and classifying glands in histological tissue image data comprising a set of pixels, by segmentation of the histological tissue image data into glands, where said glands are surrounded by stromal tissue, said method comprising the steps of:

capturing of histological tissue image data from a tissue sample that has been stained with at least one stain, said stain being light absorbent, and said stain being absorbed primarily by the stroma;

deriving at least one stromal density map, said stromal density map corresponding to the portion of the histological tissue image data that represents the stroma, and said stromal density map being derived using a color decomposition method;

segmenting the stromal density map into glands, wherein the segmenting comprises:

identifying a mask, said mask covering low-density non-stromal regions in said stromal density map, wherein identifying said mask utilizes morphological openings on said stromal density map, and converting said mask into a binary mask by thresholding, utilizing for said thresholding a difference in contrast between the stromal tissue and non-stromal tissue in said stromal density map;

finding one seed for each disconnected region or weakly connected region connected by only a few pixels in said binary mask using morphological erosion on said stromal density map, said seeds being contained in said regions, converting said seeds into binary seeds utilizing thresholding, and finding individual seeds by utilizing connected component labelling;

growing the seeds until said seeds meet said binary mask; and utilizing the boundaries of said grown seeds to identify the glands in the histological tissue image data; and classifying an identified gland into a category wherein the classification of the gland into a category is based on said gland's associated features.

2. The method of claim 1, wherein the color decomposition method is blind.

3. The method of claim 1, wherein the gland's associated features include number of luminae, nuclear crowding, and roundness of the glands and their luminae.

4. The method of claim 1, wherein the gland's associated features include the content of said gland.

5. The method of claim 1, wherein the tissue sample has been stained with a second stain, said second stain being light absorbent, and said second stain being absorbed primarily by the epithelium, wherein an epithelium density map is derived representing the epithelium in said histological tissue image data, and wherein said epithelium density map is derived using a color decomposition method.

6. The method of claim 5, wherein said color decomposition methods are blind.

7. The method of claim 5, wherein said mask covers low-density regions in a combination of the stromal density map and the epithelium density map.

8. The method of claim 7, wherein said combination is the result of a pixel-by-pixel subtraction of the epithelial density map from the stromal density map.

9. The method of claim 5, where the mask identification further comprises the step of removing non-glandular objects, said objects lacking epithelial content as determined by the epithelial density map.

10. The method of claim 1, wherein said morphological opening uses adaptive techniques.

11. The method of claim 10, wherein said adaptive techniques employ a tensor-based elliptical structuring element.

12. The method of claim 1, wherein said thresholding for converting said mask into a binary mask employs gradient maximization thresholding.

13. The method of claim 1, where said morphological erosion employs adaptive techniques.

14. The method of claim 13, wherein said adaptive techniques employ a tensor-based elliptical structuring element.

15. The method of claim 1, wherein said thresholding for converting said seeds into binary seeds employs gradient maximization thresholding.

16. The method of claim 1, where said region-growing employs watershed techniques.

17. An image capture and analysis apparatus comprising:
microscope adapted to capture histological tissue image data from a tissue sample that has been stained with at least one stain, the said stain or stains being light absorbent; and
image processing modules adapted to perform the steps of:
capturing of histological tissue image data from a tissue sample that has been stained with at least one stain, said histological tissue image data comprising a set of pixels, said stain being light absorbent, and said stain being absorbed primarily by the stroma;
deriving at least one stromal density map, said stromal density map corresponding to the portion of the histological tissue image data that represents the stroma, and wherein said stromal density map is derived using a color decomposition method;
segmenting the stromal density map into glands, wherein the segmenting comprises:
identifying a mask, said mask covering non-stromal tissue, and converting said mask into a binary mask by thresholding;
finding one seed for each disconnected region or weakly connected region connected by only a few pixels in said binary mask using morphological erosion on said stromal density map, said seeds being contained in said regions, converting said seeds into binary seeds utilizing thresholding, and finding individual seeds by utilizing connected component labelling;
growing the seeds until said seeds meet said binary mask; and
utilizing the boundaries of said grown seeds to identify glands in the histological tissue image data; and
classifying an identified gland into a category.

18. A method for identifying and classifying glands in histological tissue image data comprising a set of pixels, by segmentation of the histological tissue image data into glands, where said glands are surrounded by stromal tissue, said method comprising the steps of:
capturing of histological tissue image data from a tissue sample that has been stained with at least one stain, said stain being light absorbent, and said stain being absorbed primarily by the stroma;
deriving at least one stromal density map, said stromal density map corresponding to the portion of the histological tissue image data that represents the stroma, and said stromal density map being derived using a color decomposition method;
segmenting the stromal density map into glands, wherein the segmenting comprises:
identifying a mask, said mask covering low-density non-stromal regions in said stromal density map, wherein identifying said mask uses adaptive morphological openings with a tensor-based elliptical structuring element, and converting said mask into a binary mask by a gradient maximization thresholding technique for thresholding a difference in contrast between the stromal tissue and non-stromal tissue in said stromal density map;
finding one seed for each disconnected or weakly connected region in said mask using morphological adaptive erosion employing a tensor-based elliptical structuring element, said seeds being contained in said regions, converting said seeds into binary seeds utilizing a gradient maximization thresholding technique, and finding individual seeds by utilizing connected component labelling;
growing the seeds until said seeds meet said mask, wherein said growing employs a watershed technique; and
utilizing the boundaries of said grown seeds to identify the glands in the histological tissue image data; and
classifying an identified gland into a category wherein the classification of the gland into a category is based on said gland's associated features.

19. The method of claim 18, wherein the tissue sample has been stained with a second stain, said second stain being light absorbent, and said second stain being absorbed primarily by the epithelium, wherein an epithelium density map is derived representing the epithelium in said histological tissue image data, wherein the epithelium density map is derived using a color decomposition method, and where the step of mask identification further comprises the step of removing non-glandular objects, said objects lacking epithelial content as determined by the epithelial density map.

* * * * *